(12) United States Patent
Messing et al.

(10) Patent No.: US 10,526,003 B2
(45) Date of Patent: Jan. 7, 2020

(54) SHROUD GUIDANCE MECHANISM FOR STEERING COLUMN

(71) Applicant: STEERING SOLUTIONS IP HOLDING CORPORATION, Saginaw, MI (US)

(72) Inventors: Nicholas M. Messing, Freeland, MI (US); Benjamin D. Reichard, Saginaw, MI (US); Joel T. Cerva, Freeland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 61 days.

(21) Appl. No.: 15/718,940

(22) Filed: Sep. 28, 2017

(65) Prior Publication Data
US 2019/0092371 A1    Mar. 28, 2019

(51) Int. Cl.
*B62D 1/19* (2006.01)
*B62D 1/185* (2006.01)
*B62D 1/181* (2006.01)

(52) U.S. Cl.
CPC ............. *B62D 1/192* (2013.01); *B62D 1/181* (2013.01); *B62D 1/185* (2013.01)

(58) Field of Classification Search
CPC .......... B62D 1/185; B62D 1/19; B62D 1/192; B62D 1/181
See application file for complete search history.

(56) References Cited

U.S. PATENT DOCUMENTS

| 3,501,993 | A | 3/1970 | Swenson |
| 3,719,255 | A | 3/1973 | Daniels et al. |
| 4,142,423 | A | 3/1979 | Ikawa |
| 5,082,311 | A | 1/1992 | Melotik |
| 5,375,881 | A | 12/1994 | Lewis |
| 5,511,823 | A | 4/1996 | Yamaguchi et al. |
| 5,520,416 | A | 5/1996 | Singer, III et al. |
| 5,562,307 | A | 10/1996 | Connor |
| 5,722,299 | A | 3/1998 | Yamamoto et al. |
| 5,848,557 | A | 12/1998 | Sugiki et al. |
| 6,142,485 | A | 11/2000 | Muller et al. |
| 6,322,103 | B1 | 11/2001 | Li et al. |
| 6,328,343 | B1 | 12/2001 | Hosie et al. |
| 6,439,357 | B1 | 8/2002 | Castellon |
| 6,578,872 | B2 * | 6/2003 | Duval .................. B62D 1/195 280/777 |
| 6,659,504 | B2 * | 12/2003 | Riefe .................... B62D 1/184 280/775 |
| 7,188,867 | B2 | 3/2007 | Gatti et al. |
| 7,516,991 | B1 | 4/2009 | Cheng |

(Continued)

FOREIGN PATENT DOCUMENTS

JP    2004291691 A  * 10/2004
JP    2011057020 A    3/2011

*Primary Examiner* — Laura Freedman

(57) ABSTRACT

A shroud guidance mechanism for a steering column is provided. The shroud guidance mechanism includes a bracket operatively coupled to an upper jacket. Also included is an interface feature retained to the bracket in a first condition of the steering column. Further included is a shroud operatively coupled to the interface feature and to the upper jacket, the interface feature, the upper jacket and the shroud moveable with each other to decouple the interface feature from the bracket in a second condition of the steering column.

16 Claims, 3 Drawing Sheets

(56) References Cited

U.S. PATENT DOCUMENTS

| | | | |
|---|---|---|---|
| 8,430,428 B2* | 4/2013 | Tinnin | B62D 1/195 188/371 |
| 8,627,742 B2* | 1/2014 | Ridgway | B62D 1/192 280/777 |
| 8,764,064 B2* | 7/2014 | Riefe | B62D 1/195 280/775 |
| 8,935,968 B2 | 1/2015 | Sugiura | |
| 8,984,985 B2* | 3/2015 | Kogure | B62D 1/195 280/777 |
| 9,022,426 B2 | 5/2015 | Sakata | |
| 9,022,427 B2 | 5/2015 | Schnitzer | |
| 9,428,213 B2 | 8/2016 | Tinnin | |
| 9,637,161 B2* | 5/2017 | Orihara | B62D 1/185 |
| 9,643,641 B1* | 5/2017 | Stinebring | B62D 1/195 |
| 2003/0185648 A1 | 10/2003 | Blaess | |
| 2003/0209897 A1 | 11/2003 | Manwaring et al. | |
| 2003/0227163 A1 | 12/2003 | Murakami et al. | |
| 2004/0200306 A1 | 10/2004 | Schafer | |
| 2006/0049621 A1 | 3/2006 | Lee | |
| 2007/0137379 A1 | 6/2007 | Sanji et al. | |
| 2007/0194563 A1 | 8/2007 | Menjak et al. | |
| 2008/0106086 A1 | 5/2008 | Shimoda | |
| 2009/0200783 A1 | 8/2009 | Cymbal | |
| 2012/0125139 A1 | 5/2012 | Tinnin et al. | |
| 2012/0125140 A1 | 5/2012 | Ridgway et al. | |
| 2013/0205933 A1 | 8/2013 | Moriyama | |
| 2013/0233117 A1 | 9/2013 | Read et al. | |
| 2014/0053677 A1 | 2/2014 | Sakata | |
| 2014/0109713 A1 | 4/2014 | Bodtker | |
| 2014/0109714 A1 | 4/2014 | Bodtker | |
| 2014/0137694 A1 | 5/2014 | Sugiura | |
| 2014/0147197 A1 | 5/2014 | Yoshida et al. | |
| 2014/0230596 A1 | 8/2014 | Kwon | |
| 2015/0028574 A1 | 1/2015 | Meyer et al. | |
| 2015/0069747 A1 | 3/2015 | Sharman et al. | |
| 2015/0166093 A1 | 6/2015 | Moriyama et al. | |
| 2015/0232117 A1 | 8/2015 | Stinebring et al. | |
| 2015/0239490 A1 | 8/2015 | Sakata | |
| 2015/0251683 A1 | 9/2015 | Caverly et al. | |
| 2016/0046318 A1 | 2/2016 | Stinebring et al. | |
| 2016/0252133 A1 | 9/2016 | Caverly | |
| 2017/0129529 A1 | 5/2017 | Martinez et al. | |
| 2019/0126968 A1* | 5/2019 | Messing | B62D 1/195 |

* cited by examiner

SHROUD GUIDANCE MECHANISM FOR STEERING COLUMN

FIELD OF INVENTION

The embodiments disclosed herein relate to vehicle steering column assemblies and, more particularly, to a shroud guidance mechanism for vehicle steering column assemblies.

BACKGROUND OF INVENTION

Telescopically adjustable steering columns include a telescope actuator and one or more column jackets. The column is longitudinally moveable and internally collapsible along a longitudinal axis between a fully extended position and a fully retracted position. This collapsibility is energy-absorbing (E/A) and reduces likelihood of injury to a driver of the vehicle during an energy absorption event.

There is a requirement for a feature to act as an interface between the steering column and a shroud. The feature must be able to telescope or translate axially fore and aft with the steering wheel and remain rigidly fixed to the steering column to avoid lash between the shroud and the steering column and to prevent misalignment between the shroud and other vehicle features. The feature should also avoid audible rattle noise. However, prior designs have not been able to accomplish the above-described goals.

SUMMARY OF INVENTION

According to one aspect of the disclosure, a shroud guidance mechanism for a steering column is provided. The shroud guidance mechanism includes a bracket operatively coupled to an upper jacket. Also included is an interface feature retained to the bracket in a first condition of the steering column. Further included is a shroud operatively coupled to the interface feature and to the upper jacket, the interface feature, the upper jacket and the shroud moveable with each other to decouple the interface feature from the bracket in a second condition of the steering column.

According to another aspect of the disclosure, a steering column assembly includes an upper jacket. Also included is a lower jacket, the upper jacket translatable within the lower jacket over a range of telescoping positions during a first condition comprising a normal driving condition. Further included is a grommet retained to the bracket in a first condition of the steering column. Yet further included is a guiding component disposed between the grommet and the shroud and coupled to the shroud and the grommet. Also included is a shroud operatively coupled to the grommet and to the upper jacket, the grommet, the upper jacket and the shroud moveable with each other to decouple the grommet from the bracket in a second condition of the steering column, the second condition comprising a collapse of the upper jacket during an energy absorption event.

BRIEF DESCRIPTION OF EACH FIGURE OF DRAWING

The subject matter that is regarded as the subject invention is particularly pointed out and distinctly claimed in the claims at the conclusion of this specification. The foregoing and other features and advantages of the invention are apparent from the following detailed description of non-limiting exemplary embodiments of the invention taken in conjunction with the accompanying drawing thereof in which:

DETAILED DESCRIPTION OF EMBODIMENTS OF INVENTION

Referring now to the Figures, wherein like numerals indicate corresponding parts, the subject invention is described below with reference to specific non-limiting embodiments thereof. The embodiments described herein related to a shroud guiding mechanism associated with a steering column (also referred to herein as a "steering column assembly"). The steering column may be utilized in numerous types of vehicles.

Figure 1:
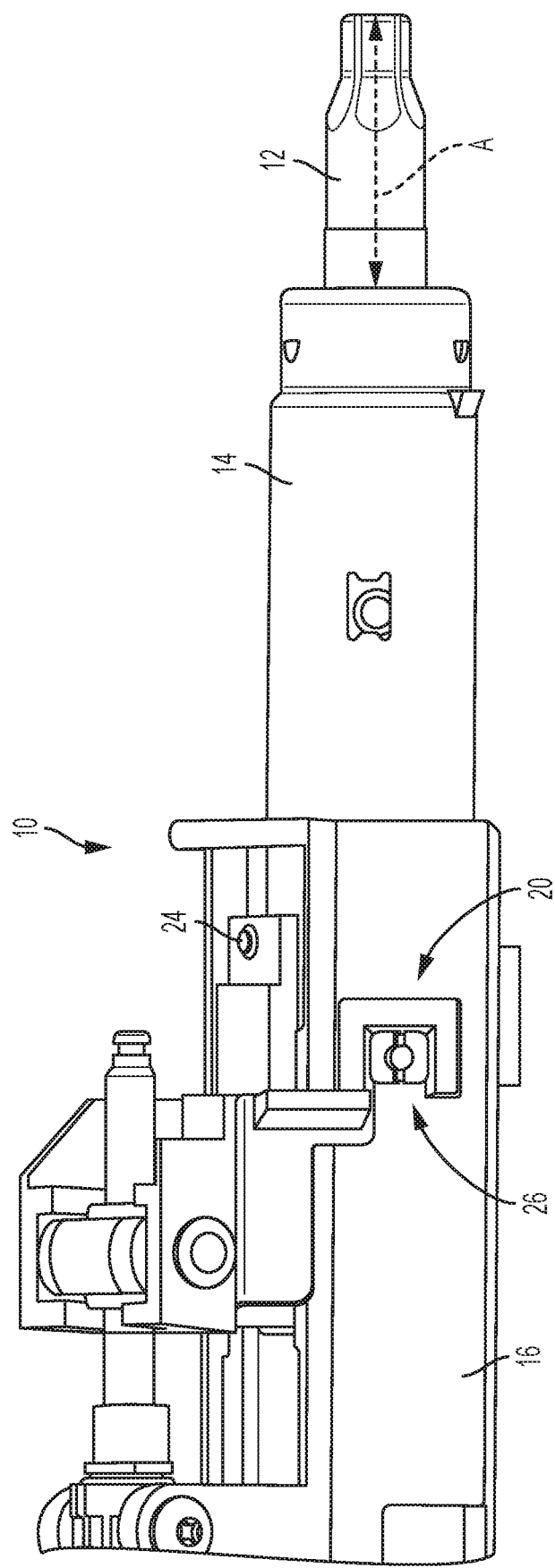
FIG. 1 is a perspective view of a steering column assembly.

Referring to FIG. 1, the steering column is illustrated and generally referenced with numeral 10. The steering column 10 substantially extends along a longitudinal axis "A." The steering column 10 is adjustable in a telescopic direction parallel to the longitudinal axis "A" (i.e., the steering column 10 is axially adjustable along the longitudinal axis "A"). More specifically, the steering column includes a steering shaft 12 rotatably disposed within a column assembly that includes an upper jacket 14 and a lower jacket 16. The steering shaft 12 may be one of a plurality of operatively coupled steering shafts in some embodiments. A steering wheel (not shown) is configured to be mounted to the steering shaft 12. The column jackets 14, 16 and the steering shaft 12 substantially extend along the longitudinal axis "A." The upper jacket 14 is movable, relative to the lower jacket 16, during a normal operating condition of the vehicle to telescopically adjust a position of the steering wheel along the longitudinal axis "A." The normal operating condition (also referred to herein as a first condition of the steering column) is defined as a normal driving condition that allows adjustment of the upper jacket 14 over a predefined range of telescoping movement that is suitable for driving.

The steering column 10 is also operable in a second operating condition defined as a collapse of the upper jacket 14 during an energy absorption event. In this way, energy-absorbing movement (i.e., energy absorbing collapsibility) of the upper jacket 14 along the longitudinal axis "A" within the lower jacket 16 is provided. To assist with a collapse event and to provide desirable characteristics during the normal operating condition, a shroud guiding mechanism is provided, as described herein. The shroud guiding mechanism is generally referenced with numeral 20.

Figure 2:
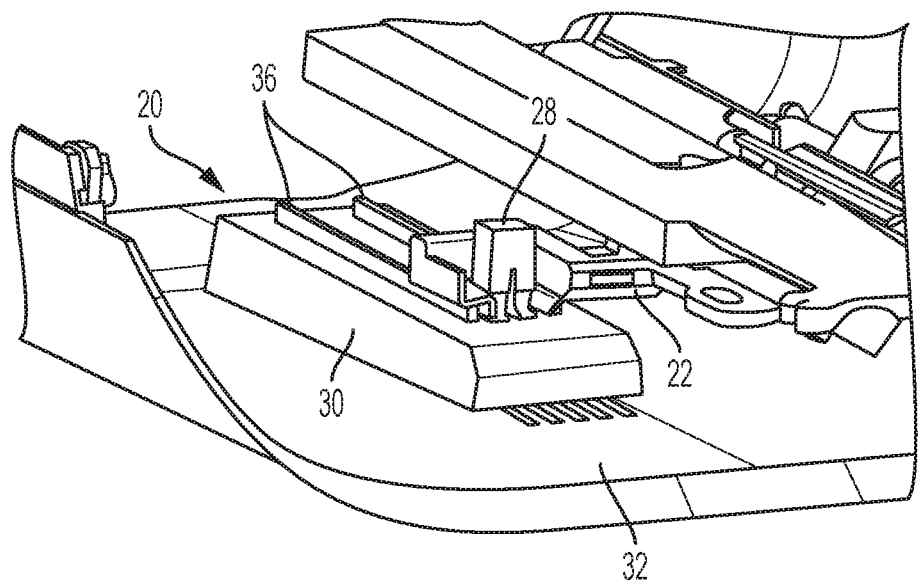
FIG. 2 is a perspective view of a shroud guidance mechanism.
Figure 3:
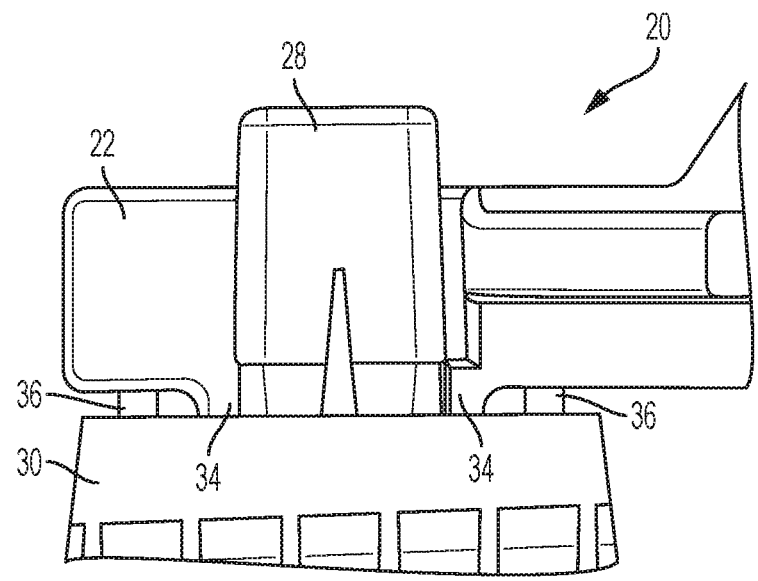
FIG. 3 is an elevational view of the shroud guidance mechanism.

Referring now to FIGS. 2 and 3, with continued reference to FIG. 1, the shroud guiding mechanism 20 is illustrated in greater detail. The shroud guiding mechanism 20 includes a bracket 22 that is operatively coupled to the upper jacket 14. Operative coupling between the bracket 22 and the upper jacket 14 may be achieved in any suitable manner, such as with a mechanical fastener proximate the location referenced with numeral 24 (FIG. 1). The bracket 22 defines a cutout portion 26 that is dimensioned to accommodate an interface feature 28 to be disposed therein. In some embodiments, the interface feature 28 is a grommet. The interface feature 28 may be formed of a resilient material in some embodiments, such as plastic, for example. The interface feature 28 is retained to the bracket 22 via any suitable retention method that allows removal of the interface feature 28 from the cutout portion 26 under certain forces, as described below. For example, the interface feature 28 may be press fit to the bracket 22 to provide an interference fit or may be retained with a staking operation.

A guiding component 30 is disposed between the interface feature 28 and a shroud 32. The guiding component 30 is also disposed between the bracket 22 and the shroud 32. The shroud 32 is a vehicle structural feature that surrounds a portion of the steering column 10. The shroud 32 is operatively coupled to the upper jacket 14 to ensure corresponding movement of the shroud 32 and the upper jacket 14 during a collapse event. The shroud guiding mechanism 20 acts as an interface between the shroud 32 and the steering column 10. The shroud guiding mechanism 20 provides an interface (i.e., interface feature 28) that axially translates during telescoping movement of the steering column 10 during the normal operating condition, yet is able to release from the steering column 10 during a collapse event, thus allowing the shroud 32 to translate forward in the vehicle. During a collapse event, the shroud guiding mechanism 20 prevents the shroud 32 from contacting other steering column components. During the normal operating condition, the shroud guiding mechanism is rigidly retained to the steering column 10 to avoid lash between the shroud 32 and the steering column 10 to prevent misalignment of the shroud 32 to vehicle features and to prevent audible rattle noise.

The guiding component 30 may be integrally formed with, or operatively coupled to, the shroud 32. For example, the guiding component 30 may be an overmolded feature of the shroud 32 or may be a separately formed component that is mechanically secured thereto. A mechanical fastener extending through the shroud 32, the guiding component 30 and into the interface feature 28 couples the shroud 32 to the interface feature 28.

Figure 4:
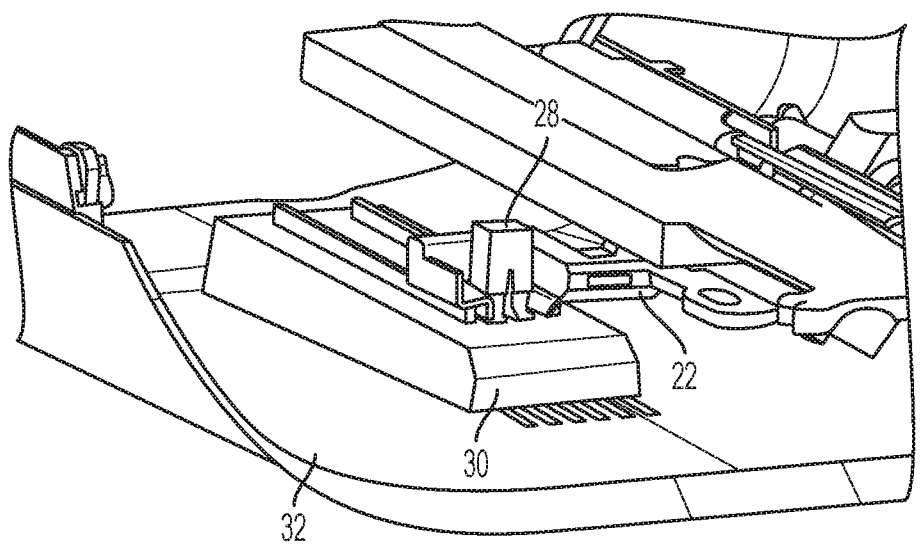
FIG. 4 is a perspective view of the shroud guidance mechanism in a first condition.
Figure 5:
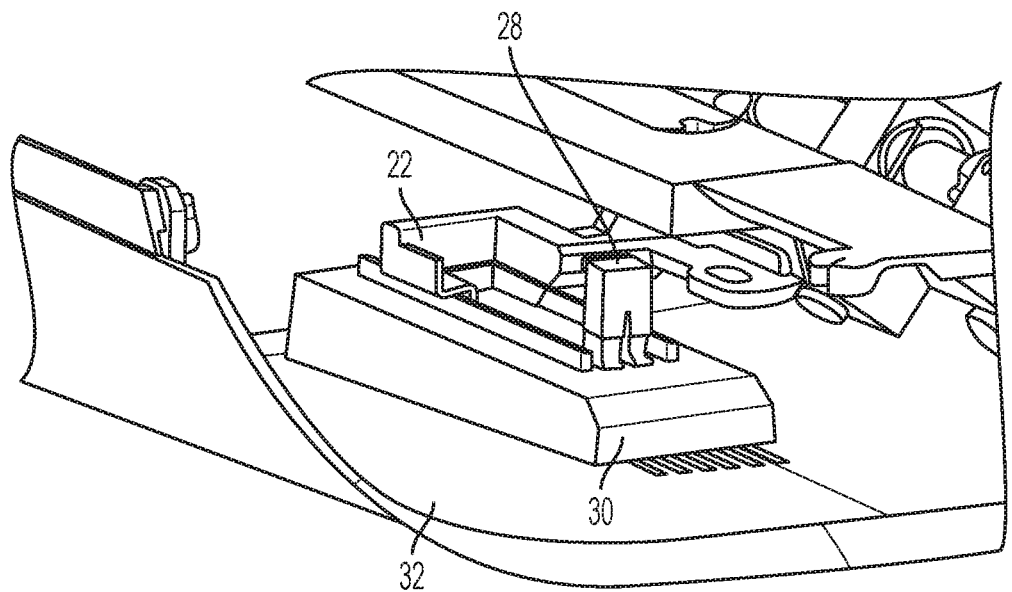
FIG. 5 is a perspective view of the shroud guidance mechanism in a second condition.

In operation, the bracket 22, the upper jacket 14, the guiding component, and the interface feature 28 all translate fore and aft substantially along axis A during the normal operating condition, thus allowing the shroud 32 to translate. This operating condition is illustrated in FIG. 4. However, during a collapse event, the bracket 22 remains stationary, while the interface feature 28 releases from the bracket 22 under a controlled load. This condition is illustrated in FIG. 5. While the collapse event occurs, the shroud 32 translates forward in the vehicle, guided by features on the bracket 22. In particular, the bracket 22 includes at least one bracket rail 34 to partially retain the interface feature 28 and to guide the guiding component 30 via one or more corresponding guide rails 36 of the guiding component 30. In the illustrated embodiment, a pair of guide rails 36 interacts with a pair of bracket rails 34. The interface feature 28 is located between the pair of bracket rails 34 and between the pair of guide rails 36. The orientation of the bracket rails 34 relative to the pair of guide rails 36 guides translation of the shroud 32 by inhibiting cross car movement.

The embodiments disclosed herein provide the above-described shroud translation guidance, while also avoiding undesirable audible rattle noise.

While the invention has been described in detail in connection with only a limited number of exemplary embodiments, it should be appreciated that the invention is not limited to such embodiments. Rather, the invention can be modified to incorporate any number of variations, alterations, substitutions, or equivalent arrangements not heretofore described, but that are commensurate with the spirit and scope of the invention. Additionally, while various non-limiting exemplary embodiments of the invention have been described, it should be appreciated that aspects of the invention may include only some of these embodiments. Accordingly, the invention is not to be seen as limited by the foregoing description.

Having thus described the invention, it is claimed:

1. A shroud guidance mechanism for a steering column, the shroud guidance mechanism comprising:
    a bracket operatively coupled to an upper jacket;
    an interface feature retained to the bracket in a first condition of the steering column;
    a shroud operatively coupled to the interface feature and to the upper jacket, the interface feature, upper jacket, and the shroud moveable with each other to decouple the interface feature from the bracket in a second condition of the steering column; and
    an axially extending guiding component disposed between the interface feature and the shroud and coupled to the shroud and the interface feature, wherein the shroud is coupled to the interface feature with a mechanical fastener extending through the guiding component.

2. The shroud guidance mechanism of claim 1, wherein the interface feature is a grommet.

3. The shroud guidance mechanism of claim 1, wherein the interface feature is at least partially formed of plastic.

4. The shroud guidance mechanism of claim 1, wherein the first condition of the steering column comprises a range of telescoping motion during normal driving conditions, the second condition comprising a collapse of the upper jacket during an energy absorption event.

5. The shroud guidance mechanism of claim 1, wherein the bracket remains stationary during movement of the upper jacket from the first condition to the second condition.

6. The shroud guidance mechanism of claim 1, wherein the guiding component is a separate component relative to the shroud and coupled thereto.

7. A shroud guidance mechanism for a steering column, the shroud guidance mechanism comprising:
    a bracket operatively coupled to an upper jacket;
    an interface feature retained to the bracket in a first condition of the steering column;
    a shroud operatively coupled to the interface feature and to the upper jacket, the interface feature, upper jacket, and the shroud moveable with each other to decouple the interface feature from the bracket in a second condition of the steering column; and
    an axially extending guiding component disposed between the interface feature and the shroud and coupled to the shroud and the interface feature, wherein the guiding component comprises at least one guide rail engaged with at least one bracket rail of the bracket to guide translation of the shroud during movement to the second condition.

8. The shroud guidance mechanism of claim 7, wherein at least one guide rail is one of a pair of guide rails, the interface feature disposed between the pair of guide rails.

9. A shroud guidance mechanism for a steering column, the shroud guidance mechanism comprising:
    a bracket operatively coupled to an upper jacket;
    an interface feature retained to the bracket in a first condition of the steering column;

a shroud operatively coupled to the interface feature and to the upper jacket, the interface feature, upper jacket, and the shroud moveable with each other to decouple the interface feature from the bracket in a second condition of the steering column; and an axially extending guiding component disposed between the interface feature and the shroud and coupled to the shroud and the interface feature, wherein the guiding component is a molded feature of the shroud.

10. A steering column assembly comprising:

an upper jacket;

a lower jacket, the upper jacket translatable within the lower jacket over a range of telescoping positions during a first condition comprising a normal driving condition;

a grommet retained to a bracket in the first condition of the steering column assembly;

a shroud operatively coupled to the grommet and to the upper jacket, the grommet, the upper jacket and the shroud moveable with each other to decouple the grommet from the bracket in a second condition of the steering column assembly, the second condition comprising a collapse of the upper jacket during an emergency energy absorption event; and a guiding component disposed between the grommet and the shroud and coupled to the shroud and the grommet, wherein the shroud is coupled to the grommet with a mechanical fastener extending through the guiding component.

11. The steering column assembly of claim 10, where in the grommet is at least partially formed of plastic.

12. The steering column assembly of claim 10, wherein the bracket remains stationary during the movement of the upper jacket from the first condition to the second condition.

13. The steering column assembly of claim 10, wherein the guiding component is a separate component relative to the shroud and coupled thereto.

14. A steering column assembly comprising:

an upper jacket;

a lower jacket, the upper jacket translatable within the lower jacket over a range of telescoping positions during a first condition comprising a normal driving condition;

a grommet retained to a bracket in the first condition of the steering column assembly;

a shroud operatively coupled to the grommet and to the upper jacket, the grommet, the upper jacket and the shroud moveable with each other to decouple the grommet from the bracket in a second condition of the steering column assembly, the second condition comprising a collapse of the upper jacket during an emergency energy absorption event; and a guiding component disposed between the grommet and the shroud and coupled to the shroud and the grommet, wherein the guiding component comprises at least one guide rail engaged with at least one bracket rail of the bracket to guide translation of the shroud during movement to the second condition.

15. The steering column assembly of claim 14, wherein the at least one guide rail is one of a pair of guide rails, the grommet disposed between the pair of guide rails.

16. A steering column assembly comprising:

an upper jacket a lower jacket, the upper jacket translatable within the lower jacket over a range of telescoping positions during a first condition comprising a normal driving condition;

a grommet retained to a bracket in the first condition of the steering column assembly;

a shroud operatively coupled to the grommet and to the upper jacket, the grommet, the upper jacket and the shroud moveable with each other to decouple the grommet from the bracket in a second condition of the steering column assembly, the second condition comprising a collapse of the upper jacket during an emergency energy absorption event; and a guiding component disposed between the grommet and the shroud and coupled to the shroud and the grommet, wherein the guiding component is a molded feature of the shroud.

* * * * *